United States Patent [19]
Howell et al.

[11] 3,714,832
[45] Feb. 6, 1973

[54] GEOTHERMAL EXPLORATION

[75] Inventors: Eddie P. Howell, Plano; Jack E. Hardison, Garland; William M. Campbell, Irving, both of Tex.

[73] Assignee: Atlantic Richfield Company, New York, N.Y.

[22] Filed: Aug. 24, 1970

[21] Appl. No.: 66,285

[52] U.S. Cl. ........................... 73/432 R, 73/154
[51] Int. Cl. ................................. G01v 9/00
[58] Field of Search....73/432 R, 431 R, 421.5 R, 23, 73/154; 23/230

[56] References Cited

UNITED STATES PATENTS

| 2,933,923 | 4/1960 | Milochik | 23/230 |
| 3,217,550 | 11/1965 | Birman | 73/432 |
| 2,708,155 | 5/1955 | Buckley et al. | 23/230 |
| 3,164,988 | 1/1965 | Cook | 73/154 |

*Primary Examiner*—S. Clement Swisher
*Attorney*—Blucher S. Tharp and Robert E. Lee, Jr.

[57] ABSTRACT

A uranium prospecting system based on the determination of temperature anomalies in the earth's crust. The earth heat flux is measured at preselected points in shallow boreholes in order to detect heat given off as a result of radioactive decay. Localized anomalies are indicative of concentrations of radioactive materials.

3 Claims, 5 Drawing Figures

PATENTED FEB 6 1973

INVENTORS
Eddie P. Howell
Jack E. Hardison
William M. Campbell

BY  Robert Elsworth Lee

ATTORNEY

PATENTED FEB 6 1973

INVENTORS
Eddie P. Howell
Jack E. Hardison
William M. Campbell

BY Robert Elsworth Lee

ATTORNEY

GEOTHERMAL EXPLORATION

BACKGROUND OF THE INVENTION

The present invention relates to exploration for radioactive elements and particularly pertains to determining uranium ore bodies by measuring geothermal effects.

Uranium is one of the heavier elements and is subject to spontaneous decomposition into lighter and more stable elements. As a result of nuclear decay, radiation particles including alpha particles, beta particles, and gamma rays are emitted. Because of the property of radioactivity, the most popular method for uranium exploration has been radiometric determination of gamma intensity to locate daughter products of the various decay series by surface checking of rocks with portable radiation detectors such as the Geiger-Muller counter, the scintillometer, and the gamma ray spectrometer. Another radiometric technique is the detection of radon seeps in the atmosphere or monitoring radon in soil gas extracted from drill holes.

Geochemical techniques are commonly used in conjunction with radiometric methods for follow-up and detail. A hydrogeochemical sampling program offers a rapid way to pinpoint the probable areas of uranium mineralization. In arid regions, soil and biogeochemical sampling procedures have been employed.

Other reconnaissance exploration methods that have been used on occasion to search for uranium include magnetic, electrical, electromagnetic, photogeology, and side-scanning radar. Remote sensing with infrared is sometimes used in conjunction with airborne surveys in an effort to detect differences in thermal energy due to oxidizing and reducing conditions around uranium ore deposits.

Finally, a drilling program is instituted in the more promising areas in order to gather core samples and hopefully make a uranium discovery. Drilling on grid centers spaced a quarter mile or more apart to depths of 400 feet or more is common procedure in sedimentary basins. However, this is extremely expensive and is only done because there is no less expensive, reliable alternative.

SUMMARY OF THE INVENTION

Applicants have invented (1) a new method of prospecting for uranium to replace or supplement the usual drilling and coring program and (2) novel temperature measuring apparatus for making thermal gradient measurements in boreholes.

According to the method of the invention, thermal gradient measurements are made between preselected points in shallow boreholes in order to determine the relative heat flux between the sample points. The heat flux values are then compared to determine the presence of any anomalous heat sources indicative of uranium ore bodies.

This involves drilling a plurality of boreholes in an area of interest and inserting temperature measuring apparatus capable of making simultaneous temperature measurements at two or more vertically separated locations, i.e. sample points. After thermal equilibrium is established between the temperature measuring apparatus and the sample points, temperature readings are taken and the heat flux between the sample points is determined. The resulting heat flux values are compared in order to ascertain whether any anomalous heat sources are present which could be attributed to the heat given off by radioactive decay reactions of uranium.

In calculating the heat flux, it is necessary to know the thermal conductivity of the formation material through which the boreholes are drilled. Conductivity may be obtained by making temperature versus time readings at one or more sample points in one or more of the boreholes. The temperature of a sample point is determined; a temperature probe having a different temperature is positioned against the sample point; and the change in temperature of the probe with respect to time is measured after predetermined intervals.

Once heat flux values are obtained, corrections are made for differences in surface elevation of the boreholes and also for annular temperature changes. Such corrections are standard and are well known to those skilled in the art.

The temperature measuring apparatus forming the other part of the invention comprises a tubular probe having a plurality of temperature sensors at vertically spaced positions. In the preferred embodiment, the temperature sensors are thermistors contained in discs that extend laterally about the probe. Decentralizer means is attached to the probe and designed to be remotely actuated from the surface. Also, means are provided for lowering the probe into and removing it from the borehole. When the decentralizer means is actuated, the sensors are forced into contact with the walls of the borehole at preselected sample points. The probe is left in position until thermal equilibrium is established with the sensors and then the desired temperature readings are taken. The temperature measuring apparatus can also be used to make conductivity measurements.

DESCRIPTION OF THE PREFERRED EMBODIMENTS

The basic steady-state heat flow equation is $$Q = K \Delta T / \Delta X$$

where
$Q$ is heat flux (cal./cm$^2$sec);
$K$ is thermal conductivity (cal./cm sec°C);
$T$ is temperature (°C); and
$X$ is distance of separation (cm).

This equation shows that the heat flux $Q$ is directly proportional to the difference in temperature $\Delta T$ between two sample points and inversely proportional to their distance of separation $\Delta X$. Thus, by measuring the temperature at two points in a borehole separated by a known distance and recording data to determine the thermal conductivity, the heat flux can be calculated.

Thermal conductivity $K$ is defined by the following equation:

$$K = (A \, \Delta T_i / C_v t \, \Delta T_t)$$

where
- $C_v$ is the heat capacity of the earth material at a sample point (cal./cm³ °C);
- $\Delta T_i$ is the initial difference in temperature between the probe and the sample point (°C);
- $t$ is time (sec);
- $\Delta T_t$ is the temperature difference between the probe and the sample point after time $t$(°C); and
- $A$ is a constant dependent on the heat capacity and geometry of the probe [cal.²/cm⁴ (°C)²].

Conductivity is determined by measuring the temperature at a sample point, contacting the sample point with a temperature measuring probe at a different temperature and observing the change of temperature of the probe with time.

Figure 1:
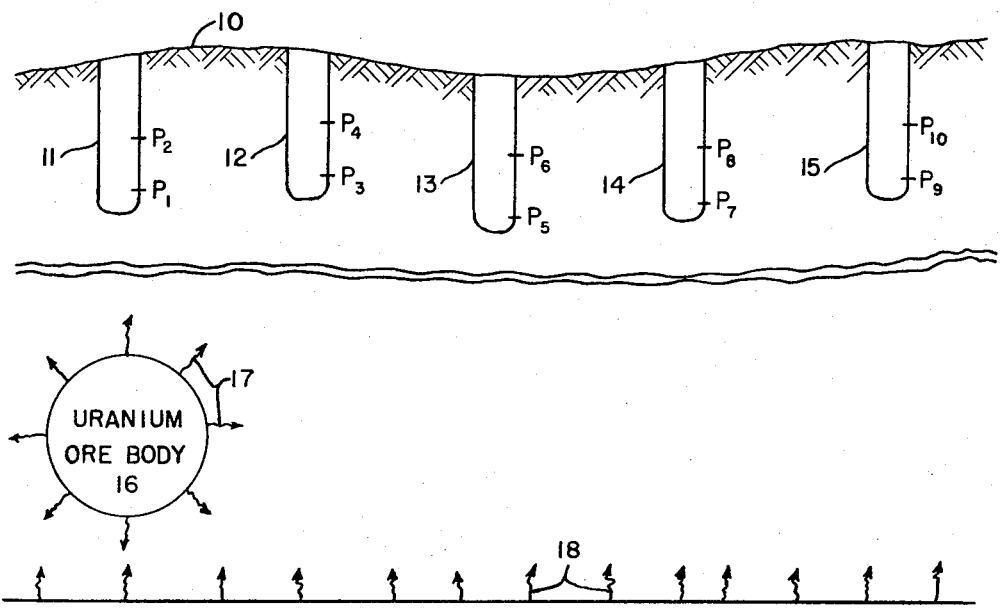
FIG. 1 is a schematic representation of a section of the earth illustrating the method of the present invention.

Referring now to FIG. 1, the procedure used in field testing for uranium is illustrated. Surface of the earth 10 is penetrated by a plurality of test boreholes exemplified by 11, 12, 13, 14, and 15. $P_1$–$P_{10}$ represent sample points in the boreholes where temperature measurements are made. Uranium ore body 16 generates a localized heat flux as indicated by arrows 17 resulting from radioactive decay reactions. The earth emits a more or less uniform background heat flux represented by arrows 18.

The vertical spacing (distance) between sample point pairs $P_1$–$P_2$, $P_3$–$P_4$, $P_5$–$P_6$, $P_7$–$P_8$, and $P_9$–$P_{10}$ is identical. Because of the earth heat flux, there will generally be a measurable flow of heat between each set of point pairs that one would expect to be about the same in each instance. However, because of the heat given off due to radioactive decay of the uranium, the earth heat flux is augmented so that abnormally high values are measured at boreholes located over or in the vicinity of ore body 16.

Figure 2:
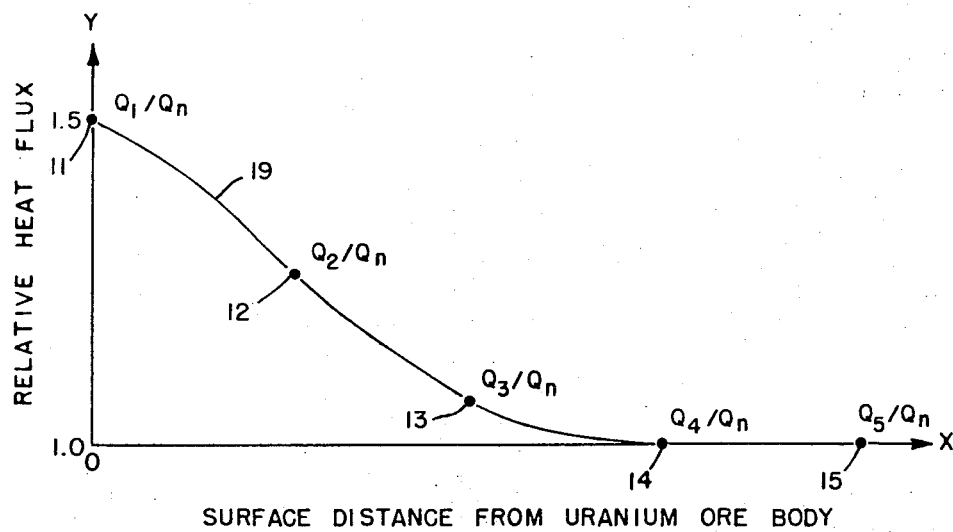
FIG. 2 is a graph used in conjunction with FIG. 1 to aid in explaining the invention.

This is indicated in FIG. 2 where surface distance from ore body 16 is plotted on the X axis and relative heat flux is plotted on the Y axis. $Q_n$ is the nominal heat flux measured in the area and $Q_1$, $Q_2$, $Q_3$, and $Q_5$ represent hypothetical values for the heat flux between sample point pairs $P_1$–$P_2$, $P_3$–$P_4$, $P_5$–$P_6$, $P_7$–$P_8$, and $P_9$–$P_{10}$, respectively. The relative heat flux values are obtained by dividing $Q_1$, $Q_2$, $Q_3$, $Q_4$, and $Q_5$ by $Q_n$. It will be seen that curve 19 deviates significantly from the X axis, differing greatest at borehole 11. Since borehole 11 is directly over ore body 16, the heat flux $Q_1$ measured between points $P_1$ and $P_2$ is greater than the heat flux between corresponding sample points in the outer boreholes, all of which are laterally displaced to a greater or lesser extent. Boreholes 12 and 13 also show greater than normal heat fluxes $Q_2$ and $Q_3$, though not as great as $Q_1$ for borehole 11. Measurements taken at boreholes 14 and 15, i.e. $Q_4$ and $Q_5$, fall on the X axis, showing that they are too far removed from ore body 16 to be affected. The magnitude of the heat flux anomaly observed at borehole 11 is shown to be 50 percent greater than $Q_n$.

In practice, the test boreholes are typically drilled to depths of about 30 to 60 feet, depending on the spacing of the boreholes and the size of ore body 16. As a general rule, the deeper the boreholes are drilled, the greater the sensitivity of the present invention since surface influences are minimized. However, in some situations depths as shallow as 10 to 30 feet may prove satisfactory and are used to reduce drilling cost. The diameter of the boreholes is generally on the order of 3 to 5 inches, depending on what drilling equipment is available. The spacing between the boreholes is generally from about 50 to 500 feet (200 feet is suggested), depending on the depth of the boreholes and size of the ore body. The boreholes can be drilled using any desired surface pattern, e.g. straight or intersecting lines or regular or random areal arrays.

Temperature measuring apparatus are inserted into the test boreholes to contact the walls at predetermined locations. A minimum of two temperature measurements must be made at vertically spaced apart locations in each borehole. Usually the top of the borehole is covered after the temperature probes are in place in order to minimize surface effects. Desirably, the probes are inserted one day and read the next in order to make sure that equilibrium has been reached.

Conductivity measurements are made in one or more of the boreholes by determining the temperature of a sample point and then contacting the point with a temperature measuring probe at a different temperature. After predetermined time intervals, e.g. 6 minutes, 8 minutes, 10 minutes, etc., the temperature of the probe is measured in order to establish the rate of change of temperature of the probe as a function of time. Using the conductivity equation previously discussed, $K$ can now be determined. Typical values for $K$ are $1 \times 10^{-3}$ to $5 \times 10^{-3}$ cal./cm sec°C.

$C_v$ is the heat capacity of the soil being logged and may be obtained from handbooks such as Heat Conduction with Engineering, Geological and Other Applications by Ingersoll, Zobel, and Ingersoll (1954). Typical values for $C_v$ are 0.3 to 0.6 cal./cm³ °C. $A$ is characteristic of the particular temperature probe and its area of contact with the sample point and is determined by using the probe to measure a sample point in a region having known conductivity. Values of $A$ for the probes used by applicants ranged from $1 \times 10^{-4}$ to $2 \times 10^{-1}$ cal.²/cm⁴ (°C)².

In making temperature measurements, it is desirable to apply corrections for diurnal and annular temperature variations and for elevation differences. The diurnal variation is generally insignificant below about 5 feet; however, the annular variation may reach to about 50 feet. Correction data for the annual variations showing average annual surface temperatures can be obtained from the "Climatological Data" tables published by the U. S. Department of Commerce. Procedures for applying annual and diurnal corrections are described in the American Geophysical Union book Terrestrial Heat Flow, Chapter 2 (1965). Topography differences can cause noticeable effects and corrections are described in Chapter 2 of the book noted above. In most cases, a correction which is a linear function of elevation is adequate. For additional discussion concerning the calculation of periodic heat flow corrections, reference is made to Exploration Geophysics, Chapter IX, "Thermal Methods," by J. J. Jakosky (1950).

Figure 3:
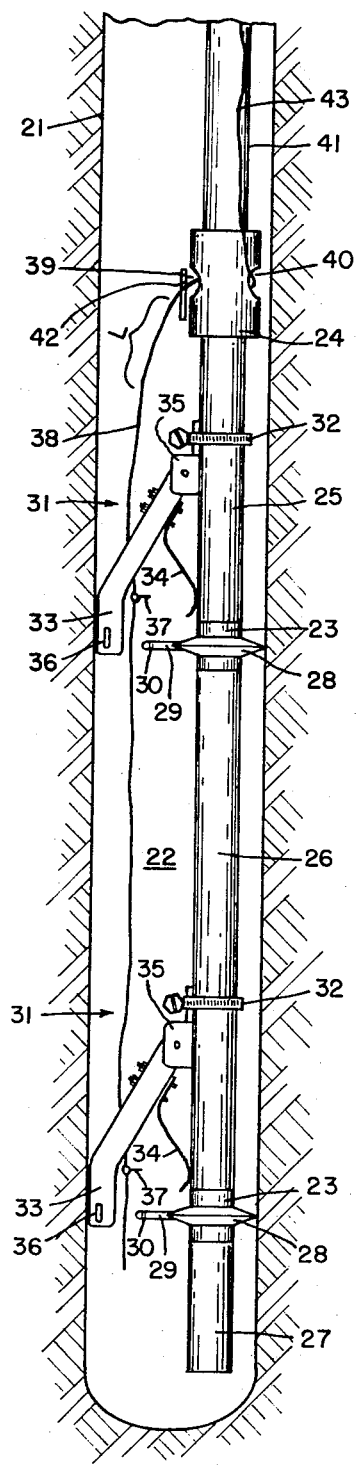
FIG. 3 is a sectional view of a borehole containing temperature measuring apparatus claimed as part of the invention.

Referring to FIG. 3, apparatus is shown for making borehole temperature measurements for heat flux and conductivity determinations. Positioned near the bottom of borehole 21 is tubular apparatus or probe 22 having temperature sensors 23, head 24, and sections 25, 26, and 27. Sensors 23 have circumferential beveled discs 28 with protruding rods 29 having apertures 30. Decentralizer means 31 are attached to sections 25 and 26 by clamps 32. Each decentralizer means 31 has arm 33 biased by spring 34 about pivot means 35. Arms 33 have eyelets 36 attached to their free ends adapted to receive rods 29 from sensors 23. Pins 37 fixedly attached to rope 38 insert into apertures 30 and hole arms 33 in closed positions. Head 24 has lateral apertures 39 and 40 and detachably connects to loading pole 41. Rope 38 passes into aperture 39 and extends uphole through loading pole 41. Stop means 42 is engaged after length L of rope 38 is pulled through aperture 39. Electrical cable 43 runs exterior to loading pole 41 and connects to head 24 through aperture 40.

Figure 4:
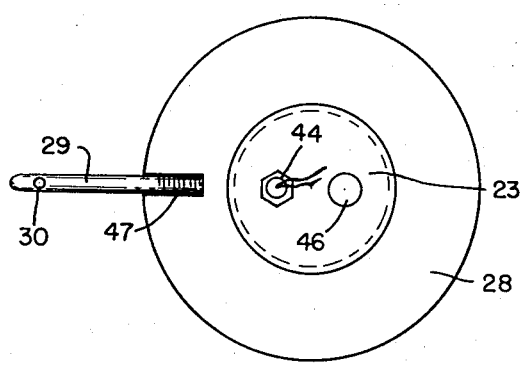
FIGS. 4 and 5 are top and side elevational views, respectively, of the temperature sensors used in the apparatus shown in FIG. 3.
Figure 5:
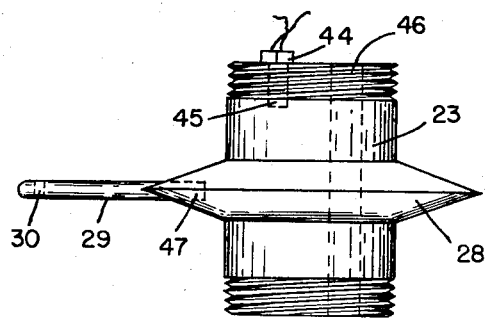

FIGS. 4 and 5 shows enlarged views of one of the temperature sensors 23. Thermistor 44 threads into tapped hole 45. Hole 46 extends all the way through sensor 23 and serves as a passage for electrical leads. Beveled disc 28 has a tapered edge for contacting the sample points. Rod 29 threads into tapped hole 47 and has hole 30 at its opposite end. Sensor 23 is constructed of a material having high thermal conductivity (e.g. aluminum) so that it will come to equilibrium quickly after contact is made with a sample point.

Referring again to FIG. 3, sections 25, 26, and 27 are fabricated of a thermal insulating material. Plastic tubing such as polyvinyl chlorine is recommended for this purpose. Sections 25, 26, and 27 are tapped to receive sensors 23 and section 25 is threaded to connect with head 24. Loading pole 41 connects to head 24 by means of a key-way slot so that it can be disconnected by twisting. Section 27 acts as a spacer to ensure that bottom sensor 23 will not contact the bottom of borehole 21. Section 26 determines the distance between sensors 23 and preferably is on the order of 10 feet in length.

In use, probe 22 is assembled with decentralizer means 31 in closed positions and inserted into borehole 21 with loading pole 41. When probe 22 is positioned at a predetermined depth and properly oriented, rope 38 is pulled upward through hole 39, thereby removing pins 37 from holes 30. This releases arms 33 and forces sensors 23 against the side of borehole 21 so that contact is made with discs 28. Loading pole 41 may now be removed leaving tubular apparatus 22 firmly planted in its downhole position. Temperature measurements are made by connecting an ohmmeter to the sensor leads in cable 43 and making resistivity measurements. When the measurements are completed, rope 38 is used to pull tubular apparatus 22 to the surface by engaging stop means 42.

A convenient method for determining conductivity is to pull apparatus 22 upward until the bottom sensor contacts the upper sample point. The temperature of the upper sample point is, of course, already known and the bottom sensor will be at a different temperature since it was in equilibrium with a different subsurface point.

If it is desired to make temperature measurements at three or more sample points in a given well, another section or sections complete with temperature sensors can be added to applicants' apparatus.

Thermistors used by applicants were obtained from the Yellow Spring Instrument Company (Yellow Springs, Ohio) and were calibrated for a 0°–40° C temperature range. Resistance measurements were made with a digital ohmmeter made by John Fluke Manufacturing Company, Model No. 8100A. This meter is battery operated and has an absolute accuracy of ±0.1% (±0.02° C) displayed by four significant digits.

Instead of making resistance measurements, a thermocouple measuring device can be used to make the desired temperature measurements at the selected sample points. Thermocouple equipment usually consists of a sensitive galvanometer, potentiometer, and a thermopile or thermocouple of special construction. An example of highly sensitive apparatus for measuring differential temperatures between selected points below the surface of the earth is given in U.S. Pat. No. 3,122,016.

What is claimed is:

1. A method of prospecting for uranium comprising
   a. drilling a plurality of boreholes in an area of interest,
   b. measuring the temperature at at least two vertically spaced sample points in each borehole,
   c. determining the heat flux between the sample points in each borehole, and
   d. comparing the heat flux values thus obtained to determine the presence of anomalous heat sources.

2. A method of prospecting for uranium comprising
   a. drilling a plurality of shallow boreholes in an area of interest,
   b. inserting temperature measuring apparatus in each borehole so that contact is made with said apparatus at at least two sample points,
   c. after thermal equilibrium is established, measuring the temperature of the sample points by resistivity measurements,
   d. determining the heat flux between pairs of the sample points, and
   e. comparing the resulting heat flux values to determine any heat anomalies.

3. A method of prospecting for uranium comprising
   a. drilling a plurality of boreholes in an area of interest,
   b. planting temperature sensors at at least two vertically spaced apart locations in each borehole,
   c. after the sensors have come to thermal equilibrium, taking temperature readings to establish the temperature gradient between the sample points,
   d. making temperature versus time readings at a sample point in at least one of the boreholes in order to determine conductivity,
   e. determining the heat flux between the sample points in each borehole using the temperature readings obtained in (c) and the conductivity value obtained in (d), and
   f. comparing the resulting heat flux value to ascertain whether there is any anomalous heat source which could be attributed to radioactive decay.

* * * * *

UNITED STATES PATENT OFFICE
Certificate

Patent No. 3,714,832                            Patented February 6, 1973

Eddie P. Howell, Jack E. Hardison, and William M. Campbell

Application having been made by Eddie P. Howell, Jack E. Hardison and William M. Campbell, the inventors named in the patent above identified, and Atlantic Richfield Company, New York, N.Y., a corporation of Pennsylvania, the assignee, for the issuance of a certificate under the provisions of Title 35, Section 256, of the United States Code, deleting the name of Jack E. Hardison as a joint inventor, and a showing and proof of facts satisfying the requirements of the said section having been submitted, it is this 2nd day of July 1974, certified that the the name of the said Jack E. Hardison is hereby deleted from the said patent as a joint inventor with the said Eddie P. Howell and William M. Campbell.

FRED W. SHERLING,
*Associate Solicitor.*